July 18, 1939.  E. P. MARLMAN  2,166,168
POISON MIXTURE FOR TRAP GUN CARTRIDGES
Filed Jan. 24, 1938

Inventor
Ethel P. Marlman.
By Marton E. Anderson
Attorney

Patented July 18, 1939

2,166,168

UNITED STATES PATENT OFFICE 2,166,168

POISON MIXTURE FOR TRAP GUN CARTRIDGES

Ethel P. Marlman, Las Animas, Colo., assignor to The Humane Fur Getter, Inc., a corporation of Colorado Application January 24, 1938, Serial No. 186,490

5 Claims. (Cl. 167—46)

This invention relates to a poison cartridge for use in trap guns of the kind disclosed and claimed in U. S. Letters Patent No. 2,059,127, granted to me October 27, 1936, and to the poison composition employed therein.

In the patent above identified, a trap gun is disclosed in which a quick acting poison such as cyanide, is shot from a shell into the mouth of the animal to be killed, instead of a bullet, as has previously been used.

This invention is directed more particularly to the specific poisonous mixture of chemicals employed in the cartridges used in trap guns of the type mentioned.

In the use of trap guns of the type referred to above, it has been found that the animal, due to the scare it receives when the gun is discharged, will start running at top speed and since even a quick acting poison, like sodium or potassium cyanide, takes some appreciable time to enter the blood stream and kill, the animals succeed in running a considerable distance before they die, with the result that it is often difficult to find the dead bodies.

It is an object of this invention to produce a poison mixture that shall contain a powerful oral irritant, such as capsicum, which will cause the animal to stop and attempt to remove this from its mouth and thus preventing it from getting too far away from the trap by the time that death overtakes it.

Figure 1:
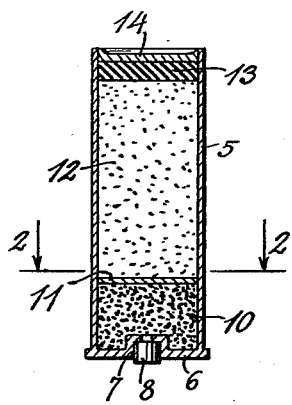
Figure 2:
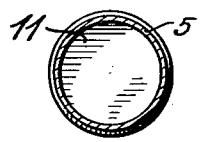

In order to most clearly describe the invention, reference will be had to the accompanying drawing in which the cartridge has been illustrated and in which:

Figure 1 is a longitudinal section through a loaded cartridge showing the relationship of the several elements thereof; and Figure 2 is a transverse section taken on line 2—2 Fig. 1.

The shell 5 of which the cartridge is formed is an ordinary shell such as is employed with rifles and has its closed end 6 provided with a central opening 7 for the reception of an ordinary cap or primer 8. Such primers contain fulminate of mercury, which is a violent explosive and will, of themselves, generate sufficient explosive force to expel material from a small shell.

A moderate amount of gunpowder 10 is placed in the bottom of the shell and covered with a wad 11 of any suitable material, such as a paper disk, a metal disk or other suitable material. In the space 12, above the wad 11, a pulverulent poisonous mixture is placed and this is held in place by a wad 13. The extreme outer end is filled with beeswax or paraffin 14 which serves to prevent the entrance of moisture.

The charge 12 comprises a violent poison such as a cyanide compound which must preferably be in the form of a powder or small crystals. The poison is preferably mixed with an insoluble powder such as magnesium oxide which prevents it from caking in case some moisture enters. Any other suitable powder can be substituted for the magnesium oxide which is merely employed as an example of a material whose function is to prevent the poison from caking or solidifying. In addition to the poison some oral irritant is added, this is preferably a strong pepper of any kind, but I have found that capsicum is very well suited for this purpose.

The poison is preferably sodium or potassium cyanide as these are easily available and comparatively cheap and are very effective, but other and slower poisons may be used, especially if the trapper is not interested in recovering the body of the animal but primarily in killing it.

A cartridge constructed in the manner described is loaded in a trap gun which is properly baited. When an animal takes the bait in its mouth the trap gun operates to explode the primer and the powder, thereby discharging the poison into the animal's mouth and throat. The explosion naturally frightens the animal which starts to run away, and even when a quick acting poison, such as a cyanide, is used, a swift running animal, like a coyote or a wolf, will succeed in running a considerable distance before it is rendered disabled by the action of the poison. For the purpose of preventing the animal from running away, an oral irritant, such as capsicum, is mixed with the poison. The burning caused by this irritant causes the animal to stop and claw at its mouth in an effort to clear it and this delay gives the poison time to act before the animal gets very far away, and it therefore dies in the vicinity of the trap.

The pulverulent material that is mixed with the poison prevents it from caking and when it is discharged into the animal's mouth it is therefore spread over the mucus surfaces and some is shot into the throat.

It is evident, therefore, that the three ingredients of the compound each perform a definite function.

The finished cartridge, although similar in appearance to an ordinary cartridge, comprises a specifically different combination of elements and forms an article of manufacture that can be used with trap guns of different kinds.

The ingredients may be mixed in various proportions but it has been found that the following proportions give good results, viz:

|  | Parts |
|---|---|
| Sodium or potassium cyanide | 85 |
| Magnesium oxide | 5 |
| Capsicum | 10 |

The ingredients are thoroughly mixed in dry state.

Having described the invention what is claimed as new is:

1. A poison mixture for use in cartridges for trap guns of the type that discharge the poison into the mouth of an animal to be killed, comprising a quick acting pulverulent poison, an insoluble non-hygroscopic powder mixed with the poison to prevent caking, and pepper that will cause an animal to stop and attempt to paw the mixture from its mouth.

2. A poison mixture for use in trap guns of the type which discharge into the mouth of animals to be killed, comprising in combination, an inorganic alkali cyanide in powdered form, and pepper.

3. A poison mixture for use in trap guns of the type which discharge into the mouth of animals to be killed, comprising in combination, an inorganic alkali cyanide in powdered form, magnesium oxide mixed with the poison to prevent it from caking, and capsicum.

4. A poison mixture for use in cartridges for trap guns of the type that discharge into the mouth of an animal to be killed, comprising a powdered hygroscopic inorganic alkali cyanide, a non-hygroscopic powder mixed with the poison to keep it from caking, and a strong pepper mixed with the other powders to cause the animal to stop and attempt to paw the poisonous mixture from its mouth, thereby delaying it in its travel from the trap.

5. A poison mixture for use in cartridges employed with trap guns of the type which discharge poison into the mouth of the animal to be killed, consisting of the following materials in substantially the proportions given

|  | Parts |
|---|---|
| Alkali cyanide | 17 |
| Magnesium oxide | 1 |
| Capsicum | 5 |

ETHEL P. MARLMAN.